(12) United States Patent
Arai et al.

(10) Patent No.: US 8,585,815 B2
(45) Date of Patent: Nov. 19, 2013

(54) NON-AQUEOUS INKJET INK

(75) Inventors: Masakatsu Arai, Ibaraki-ken (JP); Syotaro Kon, Ibaraki-ken (JP); Hiroshi Hayashi, Ibaraki-ken (JP); Kenji Shimomura, Ibaraki-ken (JP); Teruaki Okawa, Ibaraki-ken (JP)

(73) Assignee: Riso Kagaku Corporation, Tokyo (JP)

( * ) Notice: Subject to any disclaimer, the term of this patent is extended or adjusted under 35 U.S.C. 154(b) by 276 days.

(21) Appl. No.: 13/210,845

(22) Filed: Aug. 16, 2011

(65) Prior Publication Data
US 2012/0048141 A1   Mar. 1, 2012

(30) Foreign Application Priority Data

Aug. 25, 2010  (JP) ................................. 2010-188037

(51) Int. Cl.
*C09D 11/02* (2006.01)

(52) U.S. Cl.
USPC ........................................ 106/31.6; 106/31.8

(58) Field of Classification Search
USPC ............................................ 106/31.6, 31.8
See application file for complete search history.

(56) References Cited

U.S. PATENT DOCUMENTS

| | | | | | |
|---|---|---|---|---|---|
| 5,236,494 | A | * | 8/1993 | Kano | 524/322 |
| 5,372,635 | A | * | 12/1994 | Wasilewski et al. | 106/31.67 |
| 5,853,466 | A | * | 12/1998 | Matsuura et al. | 106/31.26 |
| 5,902,388 | A | * | 5/1999 | Matsuura et al. | 106/31.25 |
| 6,468,379 | B1 | * | 10/2002 | Naito et al. | 156/235 |
| 6,517,628 | B1 | * | 2/2003 | Pfaff et al. | 106/417 |
| 6,709,542 | B1 | * | 3/2004 | Naito et al. | 156/235 |
| 6,723,383 | B2 | * | 4/2004 | Nigam | 427/261 |
| 7,799,123 | B2 | * | 9/2010 | Endo et al. | 106/31.86 |
| 7,833,333 | B2 | * | 11/2010 | Pulina et al. | 106/31.13 |
| 8,394,185 | B2 | * | 3/2013 | Ezaki et al. | 106/31.25 |
| 8,414,696 | B2 | * | 4/2013 | Arai et al. | 106/31.78 |

FOREIGN PATENT DOCUMENTS

| | | |
|---|---|---|
| JP | 2004-083862 A | 3/2004 |
| JP | 2006-083312 A | 3/2006 |
| JP | 2007-277352 A | 10/2007 |

OTHER PUBLICATIONS

Machine translation of JP 2004/083862; Mar. 2004.*
Machine translation of JP 2006/083312; Mar. 2006.*
Machine translation of JP 2007/277352; Oct. 2007.*

* cited by examiner

*Primary Examiner* — Helene Klemanski
(74) *Attorney, Agent, or Firm* — Studebaker & Brackett PC

(57) ABSTRACT

A non-aqueous inkjet ink comprises silica and Brilliant Carmine 6B. A peak area obtained at the time of measurement of an organic acid quantity of a water extract of Brilliant Carmine 6B by use of a capillary electrophoresis apparatus is selected within the range of 50 to 300 mABU*sec.

2 Claims, No Drawings

NON-AQUEOUS INKJET INK

BACKGROUND OF THE INVENTION

1. Field of the Invention

This invention relates to a non-aqueous inkjet ink adapted for use in inkjet recording systems. This invention particularly relates to a non-aqueous inkjet ink containing Brilliant Carmine 6B.

2. Description of the Related Art

Inkjet recording systems have advantages in that an image having a high resolution and good image quality is capable of being printed quickly with low noise and by use of a comparatively cheap apparatus. By virtue of the advantages described above, recently, the inkjet recording systems have quickly become popular. Inks used for the inkjet recording systems are roughly classified into aqueous inks and non-aqueous inks. The non-aqueous inks have the advantages in that on-printer stability, such as intermittent jetting-out performance, or jetting-out recoverability of the inks after being left to stand for a long period of time, is good, in that the inks do not cause the printing paper to be curled, and in that penetration drying time of the inks is short. However, since the non-aqueous inks contain non-volatile solvents, the problems are encountered in that strike through to the back of the paper is apt to occur. In order to improve the strike through, Japanese Unexamined Patent Publication No. 2004-083862 or 2007-277352 proposes addition of silica to the inks.

In the non-aqueous inks, pigments having high solvent resistance are often used. Particularly for magenta color, Brilliant Carmine 6B is often used for its high solvent resistance and its low cost. (For example, reference may be made to Japanese Unexamined Patent Publication No. 2006-083312.)

Therefore, in order to improve the strike through of the magenta color, the inventors conducted extensive research on preparation of inks containing Brilliant Carmine 6B and silica in combination and have found that, though the strike through is improved, the storage stability becomes markedly bad.

SUMMARY OF THE INVENTION

The primary object of the present invention is to provide a non-aqueous inkjet ink containing Brilliant Carmine 6B, which ink suppresses strike through and has good storage stability.

The present invention provides a non-aqueous inkjet ink, comprising silica and Brilliant Carmine 6B,
  wherein a peak area obtained at the time of measurement of an organic acid quantity of a water extract of Brilliant Carmine 6B by use of a capillary electrophoresis apparatus is selected within the range of 50 to 300 mABU*sec.

The non-aqueous inkjet ink in accordance with the present invention should preferably be modified such that silica has been subjected to one of the members selected from the group consisting of methacryloxysilane treatment, trimethylsilane treatment, and aminosilane treatment.

The non-aqueous inkjet ink in accordance with the present invention comprises silica and Brilliant Carmine 6B, wherein the peak area obtained at the time of measurement of the organic acid quantity of the water extract of Brilliant Carmine 6B by use of the capillary electrophoresis apparatus is selected within the range of 50 to 300 mABU*sec. Therefore, the non-aqueous inkjet ink in accordance with the present invention suppresses the strike through and has good storage stability.

DETAILED DESCRIPTION OF THE INVENTION

The non-aqueous inkjet ink in accordance with the present invention is characterized by comprising silica and Brilliant Carmine 6B, wherein the peak area obtained at the time of measurement of the organic acid quantity of the water extract of Brilliant Carmine 6B by use of the capillary electrophoresis apparatus is selected within the range of 50 to 300 mABU*sec.

Brilliant Carmine 6B is widely used for the coloring of printing inks, paints, and plastic materials. Particularly, Brilliant Carmine 6B is used as a magenta pigment for inks. For the purposes of controlling particles and enhancing transparency, clearness, and dispersibility, Brilliant Carmine 6B is treated at the time of pigment production by use of natural rosin, such as gum rosin, wood rosin, or tall oil rosin; or modified rosin, such as hydrogenated rosin, dismutated rosin, maleated rosin, or polymerized rosin.

In cases where silica, which has conventionally been added for prevention of the strike through, is contained for the purposes of preventing the strike through of the ink which contains Brilliant Carmine 6B, though the strike through is improved, the storage stability becomes markedly bad. The inventors eagerly studied and found that the storage stability of the ink containing silica and Brilliant Carmine 6B in combination has close relationship with the rosin treatment degree of Brilliant Carmine 6B. The rosin treatment degree may be measured in terms of the peak area obtained at the time of the measurement of the organic acid quantity of the water extract of Brilliant Carmine 6B by use of the capillary electrophoresis apparatus. In cases where the peak area is selected within the range of 50 to 300 mABU*sec, the strike through is suppressed, and at the same time the storage stability is enhanced.

In order for the suppression of the strike through and the storage stability to be enhanced even further, the peak area should preferably be selected within the range of 75 to 300 mABU*sec, and should more preferably be selected within the range of 100 to 250 mABU*sec. If the peak area is less than 50 mABU*sec, the balance of the interaction among the pigment, a dispersant, and a solvent will be lost, and therefore the storage stability will not be obtained. If the peak area is more than 300 mABU*sec, the dispersion will become excessive, and a mean particle diameter of Brilliant Carmine 6B will become markedly small. Therefore, in such cases, Brilliant Carmine 6B will not remain on the paper surface, will penetrate to the inside of the paper, and the effect of suppression of the strike through will not be obtained.

The water extract of Brilliant Carmine 6B may be prepared in the manner described below. Specifically, firstly, 8 g of Brilliant Carmine 6B and 8 g of methanol are introduced into a beaker and allowed to become intimate with each other. Thereafter, 32 g of ion-exchanged water is added to the resulting mixture. The thus obtained mixture is heated to a boiling state with stirring by use of an electric heater having been set at a temperature of 140° C. When a period of time of five minutes has elapsed after the boiling state, the electric heater is set at a temperature of 60° C., and the heating is continued for 30 minutes. Ion-exchanged water is then added such that a net quantity becomes equal to 40 g. The resulting mixture is subjected to filtration with a membrane filter (material: cellulose acetate, pore diameter: 0.2 μm). The water extract of Brilliant Carmine 6B may be prepared in accordance with the procedure described above.

With respect to the thus prepared water extract, an organic acid peak area is measured by use of a capillary electrophoresis apparatus (CAPI-3300, manufactured by Otsuka Electronics Co., Ltd.). Measurement conditions are as described below.

Capillary size: Inner diameter 75 μm, overall length 800 mm
Sample injection method: Drop method (Δh=30 mm, 30 sec)
Voltage: −10.0 kv (constant voltage)
Temperature: 25° C.
Detection method: Indirect UV method
Detection wavelength: 220 nm (range 200 to 400 nm, wavelength interval 5 nm)
Sample preparing liquid: Distilled water
Peak detection conditions are as described below.
Differentiation: Seven points
Slope: 0.01 mABU/min
Drift: 0.02 mABU/min
Minimum height: 0.5 mABU
Minimum width: 0.02 sec
Minimum area: 1 mABU*sec Examples of Brilliant Carmine 6B, wherein the peak area obtained at the time of measurement of the organic acid quantity of the water extract by use of the capillary electrophoresis apparatus is selected within the range of 50 to 300 mABU*sec, include L5B01 (manufactured by Clariant K.K.), ECR-102 (manufactured by Dainichiseika Color & Chemicals Mfg. Co., Ltd.), and VP2213 (manufactured by Clariant K.K.). The containing quantity of Brilliant Carmine 6B should preferably be selected within the range of 0.5 to 20 mass % with respect to the total quantity of the ink.

Besides Brilliant Carmine 6B, the ink in accordance with the present invention may also contain known inorganic pigments and known organic pigments. Examples of the inorganic pigments include titanium oxide, iron oxide red, cobalt blue, ultramarine, Prussian blue, carbon black, calcium carbonate, kaolin, clay, barium sulfate, talc, and silica. Examples of the organic pigments include insoluble azo pigments, azo lake pigments, condensed azo pigments, condensed polycyclic pigments, and copper phthalocyanine pigments. Each of the above-enumerated pigments may be used alone. Alternatively, two or more of the above-enumerated pigments may be used in combination. The adding quantity of the pigments (including Brilliant Carmine 6B) should preferably be selected within the range of 0.5 to 20 mass % with respect to the total quantity of the ink.

As silica, it is preferable to employ silica having been subjected to one of the members selected from the group consisting of methacryloxysilane treatment, trimethylsilane treatment, dimethylsiloxane treatment, and aminosilane treatment. From the view points of the storage stability of the ink and the suppression of the strike through, it is more preferable to employ silica having been subjected to one of the members selected from the group consisting of the methacryloxysilane treatment, the trimethylsilane treatment, and the aminosilane treatment. Examples of preferable silica having been subjected to the treatment described above include Aerosil R711 (silica having been subjected to the methacryloxysilane treatment, manufactured by Evonik Degussa Corporation), Aerosil R812 (silica having been subjected to the trimethylsilane treatment, manufactured by Evonik Degussa Corporation), Aerosil R106 (silica having been subjected to the dimethylsiloxane treatment, manufactured by Evonik Degussa Corporation), and Aerosil RA200H (silica having been subjected to the aminosilane treatment, manufactured by Evonik Degussa Corporation). The containing quantity of silica should preferably be selected within the range of 0.5 to 20 mass % with respect to the total quantity of the ink.

Besides the ingredients described above, the ink in accordance with the present invention may also contain a dispersant and a solvent. Examples of the dispersants include hydroxyl group-containing carboxylic acid esters, salts of long-chain polyaminoamides and polymeric acid esters, salts of polymeric polycarboxylic acids, salts of long-chain polyaminoamides and polar acid esters, polymeric unsaturated acid esters, modified polyurethanes, modified polyacrylates, polyether ester type anionic surface active agents, naphthalenesulfonic acid-formalin condensate salts, polyoxyethylene alkyl phosphoric acid esters, polyoxyethylene nonyl phenyl ethers, polyester polyamines, and stearylamine acetate.

Among the above-enumerated dispersants, the polymer type dispersants are used preferably. Examples of the polymer type dispersants include the dispersants commercially available under the following trade names: Solsperse 5000 (a phthalocyanine ammonium salt type), Solsperse 11200 (a polyamide type), Solsperse 13940 (a polyester amine type), Solsperse 17000, Solsperse 18000 (a fatty acid amine type), Solsperse 22000, Solsperse 24000, and Solsperse 28000 (each of which is manufactured by The Lubrizol Corporation); Efka 400, Efka 401, Efka 402, Efka 403, Efka 450, Efka 451, Efka 453 (a modified polyacrylate), Efka 46, Efka 47, Efka 48, Efka 49, Efka 4010, and Efka 4055 (a modified polyurethane) (each of which is manufactured by EFKA Chemicals B.V.); Demol P, Demol EP, Poiz 520, Poiz 521, Poiz 530, and Homogenol L-18 (a polycarboxylic acid type polymeric surface active agent) (each of which is manufactured by Kao Corp.); Disparon KS-860 and Disparon KS-873N4 (an amine salt of a polymeric polyester) (each of which is manufactured by Kusumoto Chemicals, Ltd.); Discole 202, Discole 206, Discole OA-202, and Discole OA-600 (a poly-chain polymeric nonionic type) (each of which is manufactured by Dai-ichi Kogyo Seiyaku Co., Ltd.); and Antaron V216 (a vinylpyrrolidone-hexadecene copolymer) (manufactured by ISP Japan Ltd.). Among the above-enumerated polymer type dispersants, the polyamide type and the polyester amine type are more preferable. The containing quantity of the dispersant may be such that the pigment described above can be dispersed sufficiently in the ink. Ordinarily, the containing quantity of the dispersant may be selected within the range of approximately 1 mass % to approximately 7 mass %.

As the solvent for the ink, it is possible to contain a non-polar organic solvent, a polar organic solvent, or a mixture of the non-polar organic solvent and the polar organic solvent. Particularly, the non-polar organic solvent should preferably be used in combination with the polar organic solvent. In cases where the non-polar organic solvent is used in combination with the polar organic solvent, the jetting-out performance becomes good. The containing quantities of the non-polar organic solvent and the polar organic solvent with respect to the total solvent quantity should preferably be such that the containing quantity of the non-polar organic solvent is selected within the range of 20 to 80 mass %, and the containing quantity of the polar organic solvent is selected within the range of 80 to 20 mass %. The containing quantities of the non-polar organic solvent and the polar organic solvent with respect to the total solvent quantity should more preferably be such that the containing quantity of the non-polar organic solvent is selected within the range of 30 to 60 mass %, and the containing quantity of the polar organic solvent is selected within the range of 70 to 40 mass %. The containing quantities of the non-polar organic solvent and the polar organic solvent with respect to the total solvent quantity should most preferably be such that the containing quantity of the non-polar organic solvent is selected within the range of 35 to 60 mass %, and the containing quantity of the polar organic solvent is selected within the range of 65 to 40 mass %.

Examples of the non-polar organic solvents include aliphatic hydrocarbon solvents, alicyclic hydrocarbon solvents, and aromatic hydrocarbon solvents. Examples of the aliphatic hydrocarbon solvents and the alicyclic hydrocarbon solvents include the solvents commercially available under the following trade names: Teclean N-16, Teclean N-20, Teclean N-22, Nisseki Naphtesol L, Nisseki Naphtesol M, Nisseki Naphtesol H, Solvent 0 L, Solvent 0 M, Solvent 0 H, Nisseki Isosol 300, Nisseki Isosol 400, AF-4, AF-5, AF-6, and AF-7 (each of which is manufactured by Nippon Oil Corporation); and Isopar G, Isopar H, Isopar L, Isopar M, Exxol D40, Exxol D80, Exxol D100, Exxol D130, and Exxol D140 (each of which is manufactured by Exxon Mobil Corporation). Examples of the aromatic hydrocarbon solvents include the solvents commercially available under the trade names of Nisseki Cleansol G (alkyl benzene) (manufactured by Nippon Oil Corporation) and Solvesso 200 (manufactured by Exxon Mobil Corporation).

As the polar organic solvent, it is possible to employ an ester type solvent, an alcohol type solvent, a higher fatty acid type solvent, an ether type solvent, or a mixture of at least two of the above-enumerated polar organic solvents. Examples of preferable polar organic solvents include the ester type solvents, such as methyl laurate, isopropyl laurate, isopropyl myristate, isopropyl palmitate, isostearyl palmitate, methyl oleate, ethyl oleate, isopropyl oleate, butyl oleate, methyl linoleate, isobutyl linoleate, ethyl linoleate, isopropyl isostearate, methyl soybean oil, isobutyl soybean oil, methyl tallate, isobutyl tallate, diisopropyl adipate, diisopropyl sebacate, diethyl sebacate, propylene glycol monocaprate, trimethylolpropane tri-2-ethylhexanoate, and glyceryl tri-2-ethylhexanoate; the alcohol type solvents, such as isomyristyl alcohol, isopalmityl alcohol, isostearyl alcohol, oleyl alcohol, hexyldecanol, octyldodecanol, and decyltetradecanol; the higher fatty acid type solvents, such as nonanoic acid, isononanoic acid, isomyristic acid, hexadecanoic acid, isopalmitic acid, oleic acid, and isostearic acid; and the ether type solvents, such as diethylene glycol monobutyl ethers, ethylene glycol monobutyl ethers, propylene glycol monobutyl ethers, and propylene glycol dibutyl ethers.

The polar organic solvent described above should preferably be contained in a containing quantity of at least 10 mass % with respect to the total quantity of the ink. The proportion of the polar organic solvent occupying the non-aqueous solvent in the ink should more preferably be selected within the range of 20 to 80 mass %. In such cases, sufficient stability is obtained in a storage container and on the printer, a decrease in image density does not occur with the passage of time after the printing, and printed paper of a high image density is obtained.

In addition to the ingredients described above, the ink in accordance with the present invention may also contain ordinarily used additives. Examples of the additives include surface active agents, such as anionic, cationic, amphoteric, and nonionic surface active agents; and antioxidants, such as dibutyl hydroxy toluene, propyl gallate, tocopherol, butylhydroxyanisole, and nordihydroguaiaretic acid.

The ink in accordance with the present invention may be prepared by processing, wherein all ingredients are introduced collectively or in lots into a known dispersing machine, such as a bead mill, and subjected to a dispersing process, and wherein, if necessary, the resulting dispersion is passed through a known filtering machine, such as a membrane filter.

Specifically, a first mixture, in which a part of the solvent and the entire quantity of Brilliant Carmine 6B have been mixed uniformly, is prepared. Also, a second mixture, in which a part of the solvent and the entire quantity of silica have been mixed uniformly, is prepared. Each of the first mixture and the second mixture is subjected to a dispersing process with a dispersing machine. The first dispersion and the second dispersion having thus been obtained are mixed together, and the balance of the ingredients is added to the thus prepared mixture. The resulting mixture is then passed through the filtering machine.

EXAMPLES

The present invention will further be illustrated by the following non-limitative examples.

(Preparation of Migrating Solution for Organic Acid Analysis)

Firstly, 7 mM phthalic acid was prepared by introducing 0.116 g of phthalic acid and 45 μm of a 10% solution of hexadecyltrimethylammonium hydroxide ($C_{19}H_{48}NO$: HDTMA) into a 100 ml beaker, and diluting the resulting mixture in a 100 ml measuring flask. Also, 7 mM disodium phthalate was prepared by introducing 0.147 g of disodium phthalate and 45 μm of a 10% solution of HDTMA into a 100 ml beaker, and diluting the resulting mixture in a 100 ml measuring flask. Thereafter, 7 mM phthalic acid and 7 mM disodium phthalate were mixed together, and the resulting mixture was adjusted at pH3.2 (±0.1).

(Preparation of Water Extract of Brilliant Carmine 6B)

With respect to each of the pigments 6B-321, L5B01, ECR-102, and VP2213, which are constituted of Brilliant Carmine 6B, a water extract was prepared in the manner described below. Specifically, firstly, 8 g of each pigment and 8 g of methanol were introduced into a beaker and allowed to become intimate with each other. Thereafter, 32 g of ion-exchanged water was added to the resulting mixture. The thus obtained mixture was heated to a boiling state with stirring by use of an electric heater having been set at a temperature of 140° C. When a period of time of five minutes had elapsed after the boiling state, the electric heater was set at a temperature of 60° C., and the heating was continued for 30 minutes. Ion-exchanged water was then added such that a net quantity might become equal to 40 g. The resulting mixture was subjected to filtration with a membrane filter (material: cellulose acetate, pore diameter: 0.2 μm).

(Measurement of Organic Acid Peak Area)

With respect to each pigment, an organic acid peak area was measured under the measurement conditions described above by use of the capillary electrophoresis apparatus (CAPI-3300, manufactured by Otsuka Electronics Co., Ltd.) and by use of the migrating solution for organic acid analysis having been prepared in the manner described above.

(Preparation of Ink)

Row materials were premixed in accordance with the formulation shown in Table 1 below (each numeral shown in Table 1 is expressed in units of parts by mass). Thereafter, each of a prepared liquid in accordance with a pigment dispersion formulation and a prepared liquid in accordance with a silica dispersion preparation was subjected to a dispersing process for a residence time of approximately 12 minutes with a bead mill. In this manner, each of inks in Examples 1 to 7 and Comparative Examples 1 to 4 was prepared.

(Evaluation)

(Suppression of Strike Through)

With respect to each of the inks in Examples 1 to 7 and Comparative Examples 1 to 4, a solid chart was printed with X9250 (manufactured by Riso Kagaku Corporation). Also, a color difference (ΔE) of a back surface was measured with a color analyzer (TC-1800MKII, manufactured by Tokyo Denshoku Co., Ltd.), and evaluation was made in accordance with a criterion described below.

Excellent: ΔE≤15
Good: 15<ΔE≤16
Fair: 16<ΔE≤16.5

Excellent: The viscosity change rate was lower than 3%.
Good: The viscosity change rate was lower than 5%.
Fair: The viscosity change rate was lower than 10%.
Poor: The viscosity change rate was 10% or higher than 10%, or sedimentation occurred.

Table 1 shows the formulation of each ink and the evaluation results.

TABLE 1

| | | | Organic acid peak area | Primary particle diameter | Example | | | | | | | Comparative Example | | | |
|---|---|---|---|---|---|---|---|---|---|---|---|---|---|---|---|
| | | | (mABU*sec) | (nm) | 1 | 2 | 3 | 4 | 5 | 6 | 7 | 1 | 2 | 3 | 4 |
| Pigment dispersion formulation | Brilliant Carmine 6B | 6B321 | 35.4 | 150 | | | | | | | | | 6 | 6 | 6 |
| | | L5B01 | 72.4 | 75 | | | | | 6 | 6 | 6 | | | | |
| | | ECR-102 | 127.4 | 85 | 6 | 6 | 6 | | | | | 6 | | | |
| | | VP2213 | 274.7 | — | | | | 6 | | | | | | | |
| | Pigment dispersant | Solsperse 13940 | | | 1.0 | 1.0 | 1.0 | 1.0 | 1.0 | 1.0 | 1.0 | 1.0 | 1.0 | 1.0 | 1.0 |
| | | Solsperse 28000 | | | 1.0 | 1.0 | 1.0 | 1.0 | 1.0 | 1.0 | 1.0 | 1.0 | 1.0 | 1.0 | 1.0 |
| | Polar solvent | Methyl oleate | | | | 6.4 | | 6.4 | | | | | 12.8 | | |
| | | Isooctyl palmitate | | | | 6.4 | | | | 6.4 | | | | | 6.4 |
| | | Isononyl isononanoate | | | 12.8 | | 12.8 | 6.4 | 12.8 | 6.4 | 12.8 | 12.8 | | 12.8 | 6.4 |
| | Alcohol | Isomyristyl alcohol | | | 2.4 | 2.4 | 2.4 | 2.4 | 2.4 | 2.4 | 2.4 | 2.4 | 2.4 | 2.4 | 2.4 |
| Silica dispersion formulation | Silica | Aerosil R711 (methacryloxysilane treatment) | | | 2 | | | | | | | 2 | | | |
| | | Aerosil R812 (trimethylsilane treatment) | | | | 2 | | | | 2 | | | | 2 | |
| | | Aerosil R106 (dimethylsiloxane treatment) | | | | | 2 | | | | 2 | | | | |
| | | Aerosil RA200H (aminosilane treatment) | | | | | | 2 | 2 | | | | | | 2 |
| | Pigment dispersant | Solsperse 13940 | | | 0.5 | 0.5 | 0.5 | 0.5 | 0.5 | 0.5 | 0.5 | | 0.5 | 0.5 | 0.5 |
| | | Solsperse 28000 | | | 0.8 | 0.8 | 0.8 | 0.8 | 0.8 | 0.8 | 0.8 | | 0.8 | 0.8 | 0.8 |
| | Polar solvent | Methyl oleate | | | | 4.9 | | 4.9 | | | | | 9.8 | | |
| | | Isooctyl palmitate | | | | 4.9 | | | | 4.9 | | | | | 4.9 |
| | | Isononyl isononanoate | | | 9.8 | | 9.8 | 4.9 | 9.8 | 4.9 | 9.8 | | | 9.8 | 4.9 |
| | Alcohol | Isomyristyl alcohol | | | | | | | | | | | | | |
| Diluent | Polar solvent | Methyl oleate | | | | 10.7 | | 10.7 | | | | | 21.4 | | |
| | | Isooctyl palmitate | | | | 10.7 | | | | 10.7 | | | | | 10.7 |
| | | Isononyl isononanoate | | | 21.4 | | 21.4 | 10.7 | 21.4 | 10.7 | 21.4 | 34.5 | | 21.4 | 10.7 |
| | Alcohol | Isomyristyl alcohol | | | 2.3 | 2.3 | 2.3 | 2.3 | 2.3 | 2.3 | 2.3 | 2.3 | 2.3 | 2.3 | 2.3 |
| | Non-polar solvent | AF6 | | | 40 | 40 | 40 | 40 | 40 | 40 | 40 | 40 | 40 | 40 | 40 |
| | | Total | | | 100 | 100 | 100 | 100 | 100 | 100 | 100 | 100 | 100 | 100 | 100 |
| Evaluation results | | Suppression of strike through | | | Excellent | Excellent | Excellent | Fair | Good | Good | Fair | Poor | Good | Good | Good |
| | | Storage stability | | | Excellent | Excellent | Excellent | Excellent | Excellent | Good | Fair | Excellent | Poor | Poor | Poor |
| | | Ink viscosity (mPa · s) | | | 12.5 | 12.1 | 8.4 | 9.6 | 9.3 | 13.4 | 10.3 | 10.4 | 10.8 | 10.7 | 10.7 |
| | | Overall evaluation results | | | Excellent | Excellent | Excellent | Fair | Good | Good | Fair | Poor | Poor | Poor | Poor |

Poor: 16.5<ΔE (Storage Stability)

With respect to each of the inks in Examples 1 to 7 and Comparative Examples 1 to 4, the viscosity was measured in the manner described below. Specifically, by use of Rheometer RS75 (manufactured by Thermo Haake Corp., Ltd.) and a cone having a diameter of 6 cm, a shearing stress was increased from 0.7 to 100 (1/s) within a period of time of 60 seconds at a temperature of 23° C., and the viscosity at the time of a shearing stress of 100 (1/s) was measured. Also, 50 ml of each ink was introduced into a glass bottle and allowed to stand for one month under a 70° C. environment. Thereafter, the viscosity was measured again. Evaluation was made in accordance with the criterion described below. The viscosity listed in Table 1 represents the measured value prior to the storage stability test.

As shown in Table 1, with the ink prepared in each of Examples 1, 2, and 3, which ink contained silica and Brilliant Carmine 6B, the strike through was suppressed, and the storage stability was excellent. With the ink prepared in Comparative Example 1, which ink did not contain silica, though the storage stability was excellent, the strike through occurred markedly. Also, as for the ink containing silica and Brilliant Carmine 6B, with the ink prepared in each of Comparative Examples 2, 3, and 4, which ink contained Brilliant Carmine 6B of the peak area less than 50 mABU*sec, though the strike through was suppressed by silica, the storage stability was poor.

As for the ink prepared in each of Examples 5, 6, and 7, which ink contained Brilliant Carmine 6B of the same kind, with the ink prepared in Example 5, which ink contained silica having been subjected to the aminosilane treatment, and with the ink prepared in Example 6, which ink contained silica having been subjected to the trimethylsilane treatment, both the suppression of the strike through and the storage stability were better than with the ink prepared in Example 7, which ink contained silica having been subjected to the dimethylsiloxane treatment. It was thus found that, from the view points of the enhancement of the storage stability of the ink and the suppression of the strike through, silica having been subjected to the trimethylsilane treatment and silica having been subjected to the aminosilane treatment are more preferable than silica having been subjected to the dimethylsiloxane treatment. Also, silica employed in Example 2 and silica employed in Example 3 were respectively identical with silica employed in Example 6 and silica employed in Example 5, and it was found that silica employed in Example 1 and having been subjected to the methacryloxysilane treatment, which silica obtained the results of the evaluation equivalent to silica employed in each of Examples 2 and 3, was preferable from the view points of the enhancement of the storage stability of the ink and the suppression of the strike through.

With the ink prepared in Example 4, which ink contained silica having been subjected to the dimethylsiloxane treatment, the storage stability was better than with the ink prepared in Example 7. The excellent storage stability of the ink prepared in Example 4 was obtained due to the feature such that the peak area of Brilliant Carmine 6B employed in Example 4 was larger than the peak area of Brilliant Carmine 6B employed in Example 7. Specifically, it was indicated that, in cases where the organic acid quantity of Brilliant Carmine 6B was large (i.e., the peak area was closer to 300 mABU*sec), the storage stability was kept sufficiently regardless of the kind of the treatment of silica.

As described above, the non-aqueous inkjet ink in accordance with the present invention comprises silica and Brilliant Carmine 6B as the pigment, wherein the peak area obtained at the time of measurement of the organic acid quantity of the water extract of Brilliant Carmine 6B by use of the capillary electrophoresis apparatus is selected within the range of 50 to 300 mABU*sec. Therefore, the non-aqueous inkjet ink in accordance with the present invention suppresses the strike through and has good storage stability.

What is claimed is:

1. A non-aqueous inkjet ink, comprising silica and Brilliant Carmine 6B,
    wherein a peak area obtained at the time of measurement of an organic acid quantity of a water extract of Brilliant Carmine 6B by use of a capillary electrophoresis apparatus is selected within the range of 50 to 300 mABU*sec.

2. A non-aqueous inkjet ink as defined in claim 1 wherein silica has been subjected to one of the members selected from the group consisting of methacryloxysilane treatment, trimethylsilane treatment, and aminosilane treatment.

* * * * *